Nov. 17, 1936.　　　H. L. JOHNSTON　　　2,060,807
FOOD HANDLING APPARATUS
Filed Feb. 13, 1935　　　2 Sheets-Sheet 1
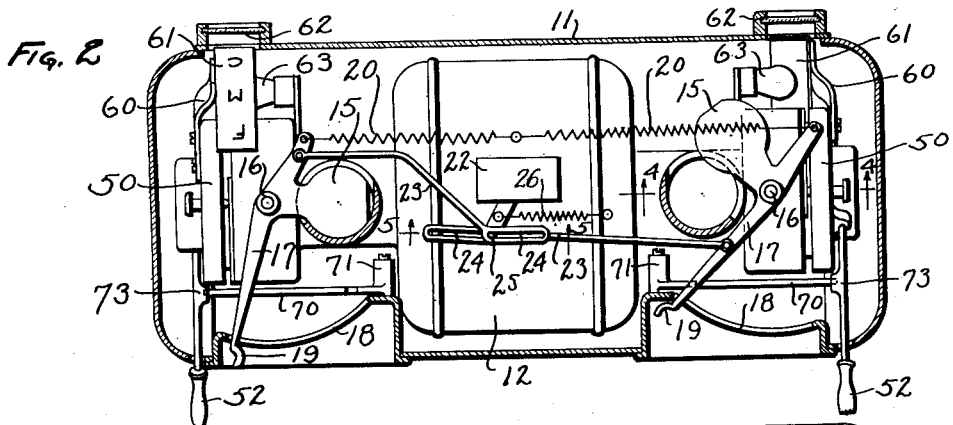
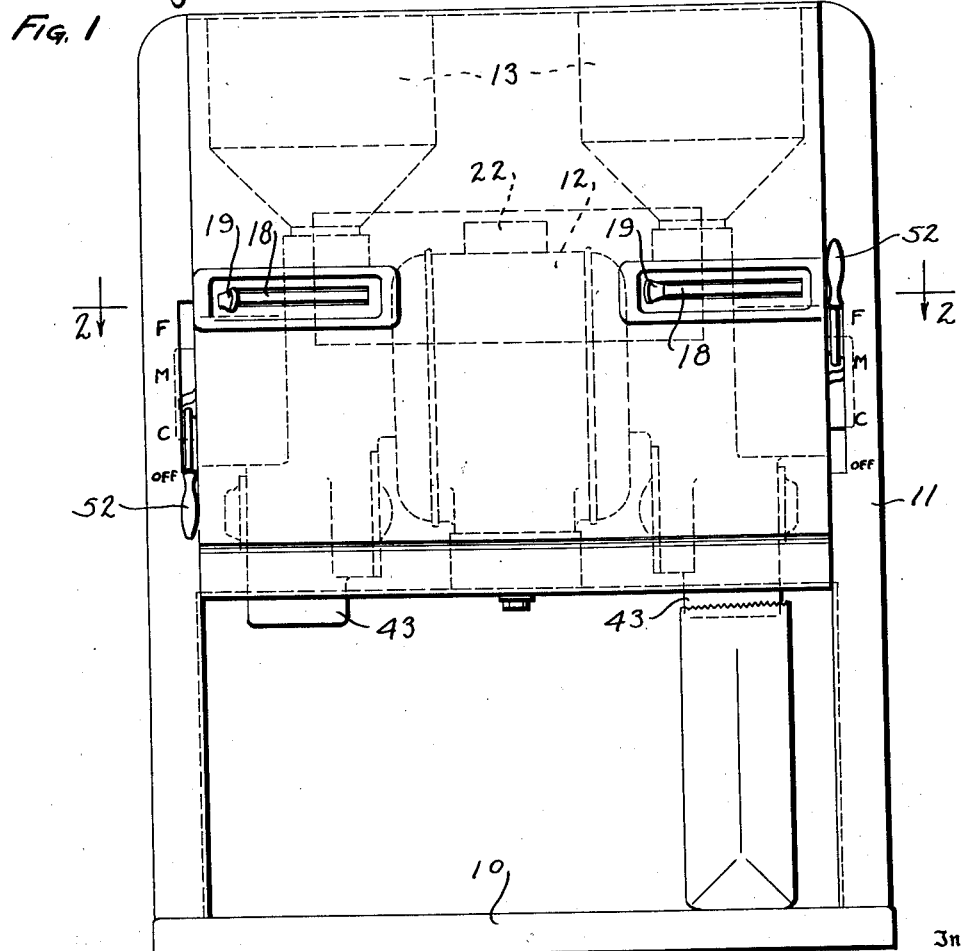
Inventor
Herbert L. Johnston
By Marechal & Noe
Attorneys Nov. 17, 1936.  H. L. JOHNSTON  2,060,807
FOOD HANDLING APPARATUS
Filed Feb. 13, 1935   2 Sheets-Sheet 2

Inventor
Herbert L. Johnston
By Marechal & Noe
Attorneys

Patented Nov. 17, 1936

2,060,807

UNITED STATES PATENT OFFICE 2,060,807

FOOD HANDLING APPARATUS

Herbert L. Johnston, Troy, Ohio, assignor to The Hobart Manufacturing Company, Troy, Ohio, a corporation of Ohio Application February 13, 1935, Serial No. 6,347

17 Claims. (Cl. 83—18)

This invention relates to food handling apparatus and more particularly to a coffee mill.

It is the principal object of the invention to provide a coffee mill of simple construction providing for a selection of the degree of fineness of grind for each operation and having means for intercontrolling the shut-off valve, motor and grade selecting mechanisms.

It is a further object to provide a coffee mill in which the grade selecting means is resiliently operated toward non-grinding position, is held in any predetermined grinding position during the grinding operation, and until the mill is turned off, when it is released and returned to non-grinding position.

Other objects and advantages will be apparent from the description, the accompanying drawings, and the appended claims.

In the drawings,—

Fig. 1 is a view in side elevation of a coffee mill constructed in accordance with the present invention showing a double-ended construction comprising a single motor power unit and grinding units at either end thereof;

Fig. 2 is a horizontal sectional view on the line 2—2 of Fig. 1;

Figure 5:
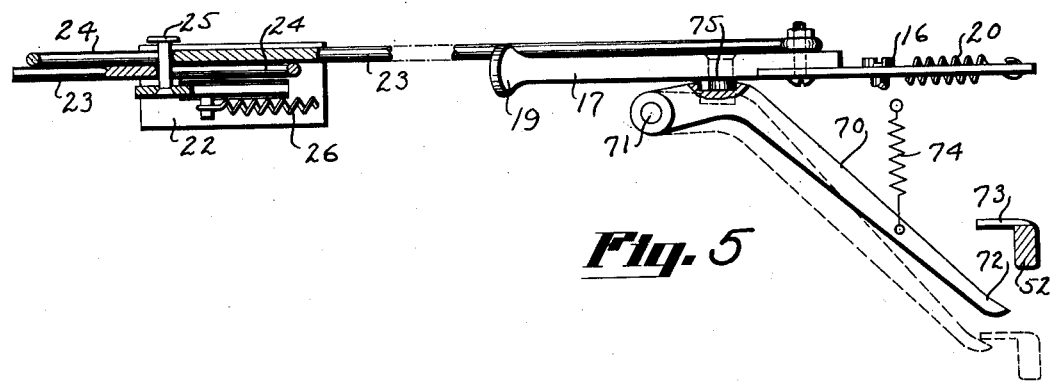
Fig. 5 is a vertical sectional view, in enlarged detail, on the line 5—5 of Fig. 2.
Figure 4:
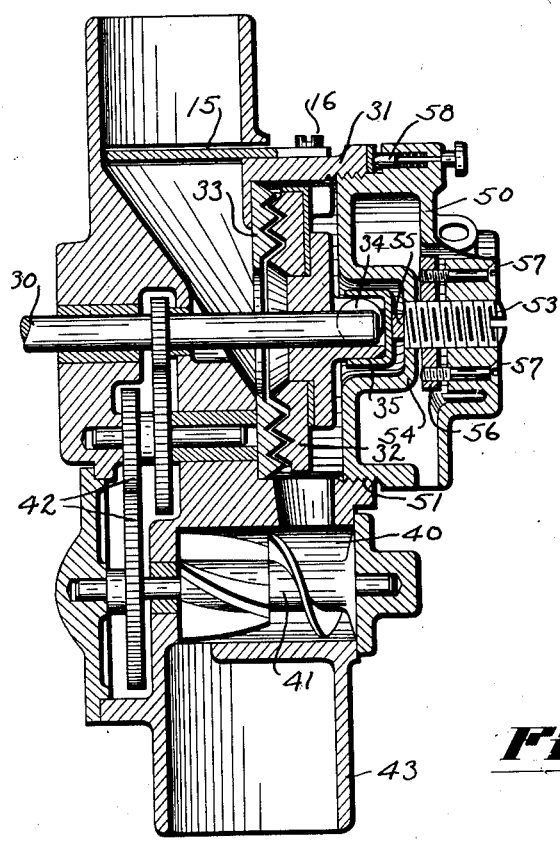
Fig. 4 is a vertical sectional view along the line 4—4 of Fig. 2.
Figure 3:
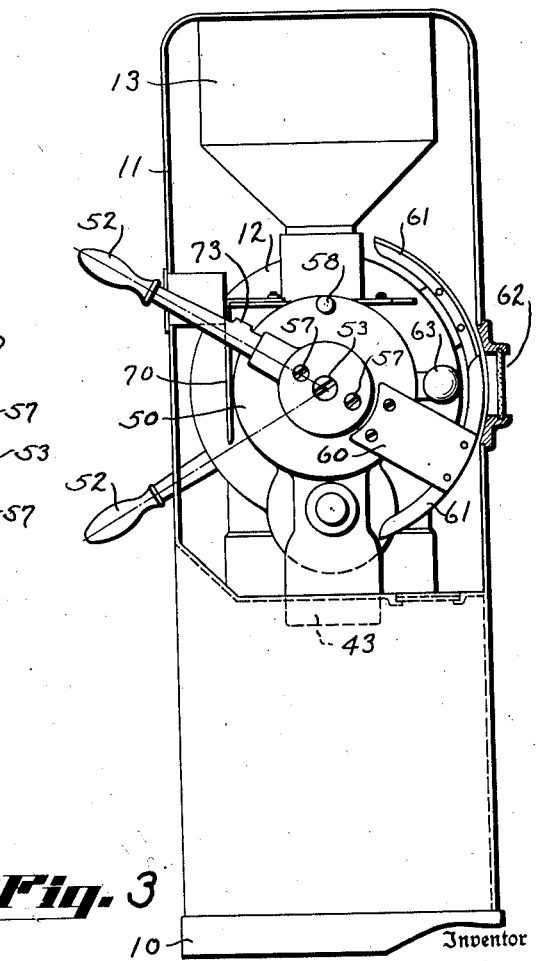
Fig. 3 is an end elevational view of the mill with the end housing plates being removed to show the interior construction.

Referring to the drawings which show a preferred embodiment of the invention, there is shown a base 10 upon which is mounted a housing 11 generally rectangular in form and preferably enclosing the operating parts of the mill. The housing encloses a suitable driving motor 12 and a pair of coffee receiving hoppers 13 which extend upwardly through the top of the mill. For purposes of illustration a mill has been shown of the double ended type, that is, comprising a single driving unit and a pair of grinding means at either end thereof which are adapted to have either the same or different range of fineness of grind. The construction of each end of the mill is the same, however, and accordingly only one construction has been shown and described. Furthermore, it will be obvious that in any case where desired only a single-ended mill may be provided comprising the driving motor and one grinding means.

The hopper 13 is provided with a gate 15 adapted to control the admission of coffee from the hopper into the grinding means. This gate is pivoted at 16 to a portion of the frame of the machine and is adapted to be operated by means of a lever 17 extending through an arcuate slot 18 formed in the casing of the mill. A handle 19 is provided which thus extends toward the operator's side of the mill in such position as to be readily accessible for operation. A tension spring 20 attached to the opposite end of the lever 17 tends to urge the lever in such position as to cause the closing of the gate 15.

A motor switch 22 controls the starting and stopping of the motor, and is preferably connected with the lever 17 so that the motor switch is actuated to "on" position simultaneously with the opening of the gate 15, and to closed position with the closing of the gate. This is accomplished by means of the link 23 attached at one end of the lever 17, and having an elongated slot 24 in the other end thereof through which extends the operating member 25 of the motor switch. A spring 26 urges the motor switch toward the "off" position. The purpose of the elongated slot is to prevent interference of the two levers at the opposite ends of the mill with each other. Each end of the mill is provided with such slotted link with the result that when either or both ends of the mill are placed in operation the motor will be started, and the corresponding gate opened, neither control interfering with the other. And when both ends of the mill are in off position, the spring 26 will cause actuation of the motor switch to its off position to stop the mill. The motor shaft 30 extends in overhanging relation into the front portion 31 of the grinding mechanism and serves as a support for the rotary grinding burr 32 which cooperates with the fixed grinding burr 33. The rotary burr is splined on the shaft 30 by means of the key 34, held in place by an end bearing member 35. This construction provides for the axial movement of the burr 32 toward and away from the fixed burr 33 to provide for adjusting the degree of fineness of the grind.

The coffee after having been ground passes into a discharge passage 40 within which is positioned a screw feed mechanism 41. This screw feed mechanism is preferably provided with a feed conveyor mechanism providing for mixing and positive feed of the ground material resulting in a packing and frictional rubbing contact of the ground coffee in the discharge passage to prevent the blowing of the coffee out of the passage by the air currents generated during the grinding operation, and also to dissipate its electrostatic charge. This screw conveyor 41 may be operated by suitable reduction gearing 42 from the motor shaft 30. The coffee is then discharged into the outlet 43 and is received within a suitable container, preferably the same container which held the coffee in bean form.

Means are provided for selecting the grade of fineness to which the coffee may be ground. This means comprises the casing 50 which has threaded engagement at 51 with the frame member 31. The casing carries an operating handle 52 extending beyond the rear of the mill and also in position to be conveniently under the control of the operator. The casing has a central opening in which is positioned a threaded member 53 which is guided at its inner end by an inwardly projecting flange 54 formed integrally with the casing member. The screw 53 is adapted to be adjusted axially with respect to the casing member and at its inner end carries a thrust member 55 adapted to bear against the end of the guide member 35 to transmit axial thrust to the rotary burr and thereby to effect its spacing from the fixed burr. A locking disk 56 is threadedly mounted upon the screw 53 and upon the tightening of screws 57, the screw 53 will be locked in any position with respect to the casing 50 to thus permit adjustment relative to the grade selector indications. A spring pressed plunger or detent 58 cooperating with recesses in the frame of the mill provides for yieldingly retaining the grade selector means in any desired position.

The grade selector means has a non-grinding position in which the burrs having maximum spacing from each other, and a plurality of grinding positions, of varying degrees of fineness which are reached as the handle 52 is moved upwardly from this non-grinding position. As the upward movement of the handle effects rotation of the casing 50, and consequent axial movement in the screw threads 51, this also causes movement of the screw 53 axially of the motor shaft which moves the rotary burr 32 closer toward the fixed burr until the position of the finest grind and the closest spacing of the burrs is reached. In each grinding position the detent 58 yieldingly holds the grade selecting member until it has been readjusted.

An extension strip 60 projects from the rotatable casing member 50 and carries an indicating chart 61 which is in arcuate form. This chart is adapted to be viewed through the window 62 from the customer's side of the mill by means of light from a suitable light source 63 which light may be transmitted through the transluscent indicating plate 61, thereby indicating to the customer the setting of the grade selector mechanism,—the indications on this chart properly corresponding to the indications, for the clerk, which are placed on the rear of the machine frame, as shown by the letters "F", "M", "C" and "Off" in Fig. 1, in such positions as to cooperate with the handle 52 when in its several grade selecting positionings.

Interlocking means are provided to be operated as incident to usual starting and stopping of the machine and thus tending to assure that for each operation of the mill the operator will act to adjust the grade selector to the position to select the desired degree of fineness of grind. This means comprises an arm 70 pivoted at 71 to the frame of the machine in such manner as to swing in a substantially vertical plane. The arm is formed with a depending extended part 72 which projects into the path of movement of a projection 73 carried on the handle 52. A spring 74 normally urges the arm 70 upwardly, but is overcome by means of the projection 73 engaging the end of the arm 72 when the grade selector control handle is moved to its non-grinding position.

The lever 17 is provided with a depending projection 75 which is adapted to cooperate with and be held in latched position by arm 70 when such arm is in its raised position. Projection 75 engages the arm 70 when the lever 17 is moved to its on position with accompanying opening of the gate and closing of the motor switch, and is held in such position, against the action of spring 20, as long as the grade selector 52 is in any of its predetermined grinding positions, the parts then occupying the position as shown in full lines in Fig. 5. In this position the handle 19 can not be moved toward its off position. When, however, the grade selector handle 52 is returned to the off or non-grinding position, projection 73 engages the end 72 of the arm, causing it to move into the position shown in dotted lines in Fig. 5. In such position the arm is moved downwardly out of the path of projection 75, releasing the lever 17 which is then returned to its off position by its spring, thus opening the motor switch and closing the gate 15 to stop the operation of the mill.

It will thus be obvious that in the normal operation of the mill the first step is to adjust the grade selector handle 52 to the desired position for effecting the proper fineness of grind. Such action releases the arm 72 so that it swings up, under the action of spring 74 into the path of the latching projection 75. Thereupon the handle 19 is operated to the on position, opening the gate 15 and starting the motor, the lever 17 being locked in on position as the projection 75 moves over the arm 70. In order to stop the operation of the mill at the end of the grinding operation, the grade selector handle is moved from its grinding position to its non-grinding position, releasing the handle 19 which returns to its off position, the grade selector remaining then in off position in preparation for a subsequent operation of the mill. With such arrangement there is more assurance that the operator will take the normal care to select the fineness in accordance with the wishes of the individual customer.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A coffee mill of the character described comprising a motor, grinding means operated thereby, grade selector means for said grinding means adjustable from a non-grinding position to a plurality of grinding positions, a hopper, a motor switch, a handle movable to an on position for causing the opening of said hopper and the closing of said motor switch, a pivoted arm, means cooperating with said pivoted arm and said handle for retaining said handle in said on position, means effective upon the movement of said grade selector means to non-grinding position to effect the release of said handle by said pivoted arm.

2. A coffee mill of the character described comprising a motor, grinding means, grade selector means for said grinding means adjustable from a non-grinding position to a plurality of grinding positions, a motor switch, a hopper, a gate for controlling the admission of said coffee from said hopper to said grinding means, a handle movable to an on position to effect the closing of said motor switch and the opening of said gate, means tending to move said handle toward the off position to stop said motor and to close said gate, a pivoted arm, a projection formed on said handle adapted to engage said arm when said handle is moved to the on position to retain the handle in such on position, and means associated with said grade selector means for withdrawing said arm from said projection to allow said handle to return to its on position when said grade selector means is moved to said non-grinding position.

3. A coffee mill of the character described comprising a motor, grinding means operated thereby, grade selector means for said grinding means adjustable from a non-grinding position to any of a plurality of grinding positions, a hopper, a gate member interposed between said hopper and the grinding means, a motor switch, a pivoted handle for operating the said gate member, a link connecting said pivoted handle and the motor switch to cause actuation of the motor switch from the handle, a pivoted arm positioned to move transversely to the path of movement of said handle, cooperating latch members carried by said handle and pivoted arm for latching the said handle when moved to motor operating position, manually operable means for effecting setting of the grade selector means, and means carried by said manually operable means for moving said pivoted arm after the grade selector means is brought into non-grinding position to effect unlatching of the said handle from the pivoted arm.

4. A coffee mill of the character described comprising a motor, grinding means operated thereby, grade selector means for said grinding means adjustable from a non-grinding position to any of a plurality of grinding positions, a hopper, a gate member interposed between said hopper and the grinding means, a motor switch, a pivoted handle for operating the said gate member, means effective to urge said pivoted handle towards gate closed position, a link connecting said pivoted handle and the motor switch to cause actuation of the motor switch from the handle, a pivoted arm positioned to move transversely to the path of movement of said handle, cooperating latch members carried by said handle and pivoted arm for latching the said handle when moved to motor operating position, manually operable means for effecting setting of the grade selector means, and means carried by said manually operable means for moving said pivoted arm after the grade selector means is brought into non-grinding position to effect unlatching of the said handle from the pivoted arm, whereupon said pivoted handle will be moved to close the said gate and open the motor switch.

5. In a coffee mill provided with a motor, grinding means operated thereby, grade selector means for said grinding means adjustable from a non-grinding position to a plurality of grinding positions, a hopper, a gate for said hopper, and a motor switch; means effective for controlling the operation of said mill comprising handle means movable at all times to an on position for effecting concomitant closing movement of said motor switch and opening movement of said gate, and means for retaining said handle in said on position when the grade selector means is in a grinding position said retaining means being effectively operative upon said handle until said grade selector means has been moved to its said non-grinding position.

6. In a coffee mill provided with a motor, grinding means operated thereby, grade selector means for said grinding means adjustable from a non-grinding position to a plurality of grinding positions, a hopper, a gate for said hopper, and a motor switch; means effective for controlling the operation of said mill comprising handle means connecting said motor switch with said hopper gate and movable to an on position to cause concomitant closing movement of the motor switch and opening movement of said hopper gate, a pivoted arm, means cooperating with said pivoted arm and said handle for retaining said handle in said on position when said grade selector means is in a grinding position, and means effective upon the movement of said grade selector means to non-grinding position to effect the release of said handle by said pivoted arm.

7. A coffee mill comprising a base, a motor, grinding means, grade selector means for said grinding means adjustable from a non-grinding position to a plurality of grinding positions, manually operable means for said grade selector means, a hopper, a gate for said hopper, a motor switch, handle means for effecting concomitant closing movement of said motor switch and opening movement of said gate, and a casing positioned on said base and enclosing said motor, grinding means, grade selector means, hopper, hopper gate, and motor switch, said casing having elongated slots in the rear side thereof and said mechanism within said casing having the several operating members for the grade selector means, the gate and the switch and the operating parts associated therewith constructed and arranged so that said several handles extend rearwardly through said slots to be manually operable from the rear side of the casing, whereby the front of said casing is unbroken by said operating member slots.

8. A mill comprising cooperating grinding elements, a motor for rotating at least one of said elements, mechanism for adjusting the separation of said elements to provide a plurality of different grinds, a control member for said adjusting mechanism movable into a neutral non-grinding position and into a plurality of operative positions corresponding to different grinds, means for operating said motor, and means operative to stop said motor only when said control member is in said neutral position.

9. A mill comprising cooperating grinding elements, a motor for rotating at least one of said elements, a switch for operating said motor, means for locking said switch, mechanism for adjusting the separation of said elements to provide a plurality of different grinds, a control member for said adjusting mechanism movable into a neutral non-grinding position and into a plurality of operative positions corresponding to different grinds, and means actuated by said control member when in said neutral position to unlock said switch.

10. A coffee mill of the character described comprising a hopper for receiving the coffee to be ground, grinding means, a motor for operating said grinding means, a motor switch, grade selector means for adjusting said grinding means to grind a predetermined grade, and interlock means preventing the opening of said motor switch except when said grade selector means is turned to predetermined off position.

11. In a coffee mill provided with a motor, grinding means operated thereby, grade selector means for said grinding means adjustable from a non-grinding position to a plurality of grinding positions, a hopper, a gate for said hopper, and a motor switch; means effective for controlling the operation of said mill comprising handle means movable at all times to an on position for effective concomitant closing movement of said motor switch and opening means of said gate, and means operatively interconnecting said handle and grade selector means for retaining said handle in said on position when the grade selector means is in a grinding position and actuating said handle to off position when said grade selector means is moved to its non-grinding position.

12. A mill comprising cooperating grinding elements, a motor for rotating at least one of said elements, a switch for operating said motor, means for locking said switch, mechanism for adjusting the separation of said elements to provide a plurality of different grinds, a control member for said adjusting mechanism movable into a neutral non-grinding position and into a plurality of operative positions corresponding to different grinds, and means actuated by said control member when in said neutral position to open said switch.

13. A mill comprising cooperating grinding elements, a motor for rotating at least one of said elements, a switch for operating said motor, a spring actuated lever for locking said switch, mechanism for adjusting the separation of said elements to provide a plurality of different grinds, a control member for said adjusting mechanism movable into a neutral non-grinding position and into a plurality of operative positions corresponding to different grinds, and a plunger actuated by said control member when in said neutral position to operate said lever and unlock said switch.

14. A mill comprising cooperating grinding elements, a motor for rotating at least one of said elements, a switch for operating said motor, means for locking said switch, mechanism for adjusting the separation of said elements to provide a plurality of different grinds, a control member for said adjusting mechanism movable into a neutral non-grinding position and into a plurality of operative positions corresponding to different grinds, and means effective upon said switch locking means and said adjusting mechanism for unlocking said switch from its normal operative position concomitantly with the return of said adjusting mechanism from a grinding position to neutral non-grinding position.

15. A coffee mill of the character described comprising cooperating grinding elements, a motor for rotating at least one of said elements, mechanism for adjusting the separation of said elements to provide a plurality of different grinds, a control member for said adjusting mechanism movable into a neutral non-grinding position and into a plurality of operative positions corresponding to different grinds, switch means for said motor, means actuated when said control member is in any of its operative positions for causing said switch means to occupy its closed-cuit position, and means actuated when said control member is in its neutral position for causing said switch means to occupy its open-circuit position.

16. A mill comprising cooperating grinding elements, a motor for rotating at least one of said elements, mechanism for adjusting the separation of said elements to provide a plurality of different grinds, a control member for said adjusting mechanism movable into a neutral non-grinding position and into a plurality of operative positions corresponding to different grinds, control switch means within the operating circuit of said motor, and means carried by said control member effective to operate said switch means to motor deenergizing position only when said control member is in said neutral position.

17. In a coffee mill of the character described having a predetermined cycle of grinding operation comprising grinding elements, a motor for moving at least one of said elements to effect the grinding operation, grade selector means operable to a neutral non-grind position and to a plurality of operative grinding positions, switch means for said motor having an on and an off position, and interlock means requiring the return of said grade selector means to neutral position to complete the cycle of operation of the mill, said interlock means being effective to actuate said switch to off position only in the neutral position of said grade selector means thereby requiring the setting of the grade selector means to desired grinding position from its neutral position upon a subsequent cycle of operation.

HERBERT L. JOHNSTON.